United States Patent Office 3,834,987
Patented Sept. 10, 1974

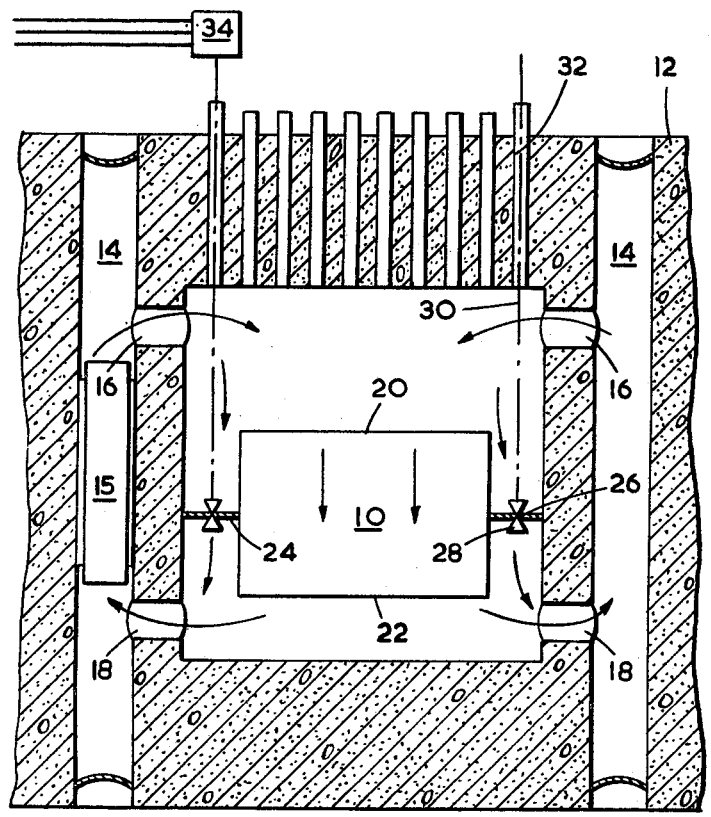

3,834,987
FLUID-COOLED NUCLEAR REACTOR
Reginald Kenneth Cook, c/o British Nuclear Design & Construction Limited, Cambridge Road, and Piotr Stanislaw Burylo, c/o The English Electric Company Limited, both of Whetstone, Leicester LE8 3LH, England
Filed Dec. 21, 1970, Ser. No. 100,055
Claims priority, application Great Britain, Dec. 23, 1969, 62,548/69
Int. Cl. G21c 7/32, 15/02
U.S. Cl. 176—59                     5 Claims

ABSTRACT OF THE DISCLOSURE

To achieve a rapid reduction in heat output from a fluid-cooled nuclear reactor which has associated therewith a direct-cycle gas turbine, provision is made for permitting a proportion of the cool coolant fluid fed to the upstream side of the reactor core to by-pass the core and mix with, and thus reduce the temperature of, heated coolant emergent from the downstream side of the core. The invention improve the accessibility of fluid control equipment and, where the gas turbine is disposed in a pod defined in the wall thickness of the reactor pressure vessel, avoids interference with the pressure vessel stressing system.

---

This invention relates to fluid-cooled nuclear reactors.

Where such a reactor has associated therewith one or more direct-cycle gas turbines arranged to employ reactor coolant as turbine working fluid a problem arises in accommodating short-term turbine load variations since the thermal inertia of the core of the reactor is much greater than the thermal inertia of the turbine or turbines. Further, where a turbine is disposed in a pod defined within the wall thickness of a pressure vessel which encloses the reactor core it is difficult to make provision for controlling the flow of fluid through or around the turbine or associated heat exchange equipment because of the inaccessibility thereof and because such provision could interfere with the stressing system of the pressure vessel.

According to the invention, in a fluid-cooled nuclear reactor having associated therewith at least one gas turbine arranged to employ reactor coolant as turbine working fluid disposed in a pod defined within the wall thickness of a pressure vessel which encloses the core of the reactor, by-pass means is provided for permitting a proportion of cool coolant fluid fed to the upstream side of the core to by-pass the core and mix with heated coolant fluid emergent from the downstream side of the core.

Preferably the by-pass means includes variable valve means whereby to enable the said proportion to be varied between zero and a predetermined maximum value.

Preferably also a peripheral seal extends between the core and the walls of the said pressure vessel, and the by-pass means includes at least one valve disposed in the peripheral seal. A standpipe may be provided which extends through the pressure vessel above the valve, control means being connected to the valve and emerging from the pressure vessel via the standpipe.

One embodiment of the invention will now be described with reference to the accompanying drawing, which is a diagrammatic sectional elevation of a gas-cooled nuclear reactor.

The reactor includes a core 10 supported within a concrete pressure vessel 12. Disposed within each of a number of pods 14 defined within the thickness of the pressure vessel wall is a direct cycle gas turbine unit 15 arranged to employ reactor coolant gas as the turbine working fluid for the purpose of generating electrical power. A reactor inlet duct 16 and outlet duct 18 provides for transfer of respectively cool and heated coolant gas between the reactor and each turbine unit 15, each inlet duct 16 connecting the respective cavity 14 to a gas inlet chamber 20 defined within the pressure vessel 12 and each outlet duct 18 similarly connecting the respective cavity 14 to a gas outlet chamber 22 defined within the pressure vessel.

The gas inlet and outlet chambers 20 and 22 are in communication with one another through the reactor core are isolated from one another, exteriorly of the core itself, by a peripheral core seal 24 which extends between the laterally outer surface of the core and the walls of the pressure vessel 12.

However, there are provided a plurality of ports 26 in the peripheral core seal, each port being controlled by a variable by-pass valve 28. Control means comprising a mechanical connection 30 extends from each valve, through a respective standpipe 32, to a control device 34 disposed outside the pressure vessel and responsive to electrical load demand.

In operation of the reactor, in response to a rapid reduction in load demand on electrical power output sensed by the control means 34, the valves 28 are opened to allow a proportion of the cool gas from the inlet ducts 16 and inlet chamber 20 to by-pass the core 10 and to mix in the outlet chamber 22 with heated gas emergent there from the core after passage therethrough from the inlet chamber 20. The temperature of the gas passing through the outlet ducts 18 is thus reduced, leading to a reduction in electrical power output. Typically the proportion of gas by-passing the core may be varied between zero and a predetermined maximum value of approximately 30%.

Because the rate of heat transfer from core to coolant is approximately proportional to coolant flowrate and because the core has a high thermal inertia, when by-pass occurs the temperature of the coolant emergent from the core will not immediately rise significantly and thus the mixing of the relatively cool by-pass coolant is able to produce a significant and rapid reduction in the temperature of the coolant before it passes through the outlet ducts. Thus an almost immediate reduction in electrical power output may be achieved. The ensuing core temperature rise occurs more slowly and can be limited conventionally by means of control rods inserted into the core.

In high-temperature reactors, in order to reduce the sensitivity of the fuel to thermal cycling (repeated short-term changes in fuel temperature) the fuel is often in a ceramic form. A result of this is that the thermal inertia of the core as a whole is increased and so the problem of providing rapid control of thermal output is even more acute. In such a case the present invention is especially advantageous.

We claim:

1. A nuclear power installation comprising a gas-cooled nuclear reactor and at least one gas turbine, the nuclear reactor comprising a pressure vessel, a reactor core enclosed within the pressure vessel, and gas inlet and gas outlet chambers defined within the pressure vessel, said chambers being filled with coolant gas under pressure and being in communication with one another through the core but otherwise isolated from one another, and the said gas turbine being connected to receive such coolant gas from the said outlet chamber, employ it as a working fluid and thereafter return it to the said inlet chamber, wherein there is provided variable by-pass valve means connected from the said inlet chamber to the said outlet chamber and controllable to permit a variable proportion of the gas returned to the said inlet chamber to flow through the valve means to the said outlet chamber without passing through the core, and in the outlet chamber to mix with heated coolant gas emergent from the core after passage therethrough from the said inlet chamber thereby to control the temperature of the gas received by the gas turbine.

2. A nuclear power installation as claimed in claim 1, wherein the pressure vessel has a cavity defined within its wall thickness and is formed with an inlet duct and an outlet duct through which, respectively, the said cavity is in communication with the said inlet and outlet chambers, and wherein the said gas turbine is housed within the said cavity.

3. A reactor according to claim 1, wherein the said proportion can be varied between zero and a predetermined maximum value.

4. A reactor according to claim 1, wherein a peripheral seal extends between the core and surrounding walls of the said pressure vessel, and the by-pass means includes at least one valve disposed in the peripheral seal.

5. A reactor according to claim 4, wherein a standpipe extends through the pressure vessel above the valve, and control means is connected to the valve and emerges from the pressure vessel via the standpipe.

References Cited

UNITED STATES PATENTS

| | | | |
|---|---|---|---|
| 3,544,425 | 12/1970 | Shaw et al. | 176—58 |
| 3,365,366 | 1/1968 | Cundill | 176—58 |
| 3,663,364 | 5/1972 | Thompson et al. | 176—58 |
| 3,446,704 | 5/1969 | Hannerz et al. | 176—61 |
| 3,305,451 | 2/1967 | Taylor et al. | 176—60 |
| 3,260,650 | 7/1966 | Kalk et al. | 176—58 |
| 3,429,775 | 2/1969 | Petersen | 176—61 X |
| 3,357,892 | 12/1967 | Schmidt | 176—65 X |
| 3,371,017 | 2/1968 | Coast et al. | 176—60 X |
| 3,324,007 | 6/1967 | Baxter | 176—60 X |

FOREIGN PATENTS

| | | | |
|---|---|---|---|
| 355,533 | 8/1961 | Switzerland | 176—58 |
| 900,821 | 7/1962 | Great Britain | 176—60 |

CARL D. QUARFORTH, Primary Examiner

R. S. GAITHER, Assistant Examiner

U.S. Cl. X.R.

176—60, 61, 65